Jan. 23, 1968 W. E. BROWN, JR 3,365,550

TELEPHONE SET

Filed June 30, 1964 2 Sheets-Sheet 1

INVENTOR
W. E. BROWN, JR.
BY
Harry L. Newman
ATTORNEY

Jan. 23, 1968 W. E. BROWN, JR 3,365,550

TELEPHONE SET

Filed June 30, 1964 2 Sheets-Sheet 2

United States Patent Office 3,365,550
Patented Jan. 23, 1968

3,365,550

TELEPHONE SET

Wilmot E. Brown, Jr., Graham, N.C., assignor to Bell Telephone Laboratories, Incorporated, New York, N.Y., a corporation of New York Filed June 30, 1964, Ser. No. 379,118
8 Claims. (Cl. 179—100)

ABSTRACT OF THE DISCLOSURE

A telephone set is disclosed that includes a conventional handset and a frustrum shaped base, the base having an annular rim at the upper end thereof. A plurality of guide posts extend upwardly from the rim, and the guide posts are spaced so as to accommodate the handset in several different rest positions. A dial is mounted within the rim and a switchhook plunger extends upwardly through the center of the dial. The switchhook plunger is biased to protrude above the rim and is depressed when the handset is placed in any one of its rest positions. The cord extending between the handset and the base is rotatably mounted in the handset.

This invention relates to telephone substation apparatus and particularly to telephone sets.

An object of this invention is to provide a new and novel telephone set.

This and other objects of this invention are achieved in an illustrative embodiment thereof wherein the telephone set comprises a base and a handset. The handset comprises a transmitter portion and a receiver portion joined together by a grip portion. The base includes a generally hexagonal housing that tapers upwardly toward an annular rim portion. The rim portion lies in a generally horizontal plane and has a plurality of guide posts extending upwardly therefrom. Adjacent guide posts are spaced from one another so as to accommodate the grip portion of the handset between any two pairs of opposing guide posts, and as a result the handset may be placed on the base in any one of a plurality of rest positions.

A dial is positioned within the rim portion of the housing, and the dial includes a face member having a plurality of apertures therein. A plurality of pushbuttons, each of which has an individual digit inscribed on the upper surface thereof, are respectively positioned within the apertures, and a biasing member associated with each pushbutton normally maintains the upper surface of each pushbutton flush with the upper surface of the face member. Thus the digits on the pushbuttons are clearly visible to a user of the dial, yet the pushbuttons are not engaged by the handset when it is placed on the base.

A switchhook plunger extends upwardly through the center of the dial and is biased to protrude above the rim portion of the housing. When, however, the handset is placed on the base in any one of the plurality of rest positions, the grip portion of the handset engages the plunger and depresses it, thereby operating the hookswitch of the telephone.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

Figure 2:
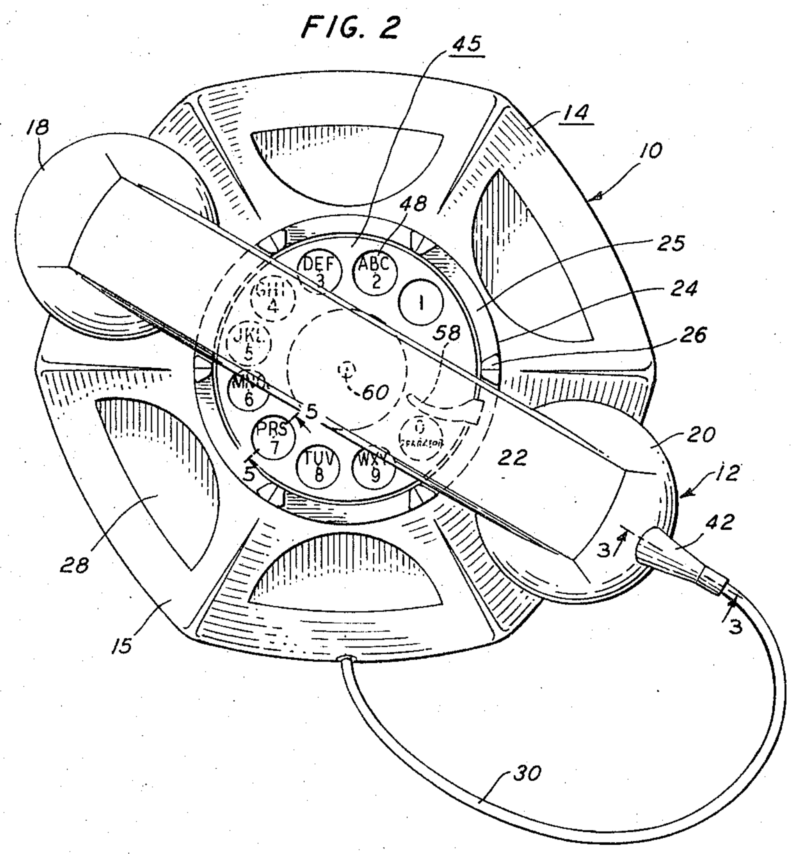
FIG. 2 is a top view of the telephone set.
Figure 1:
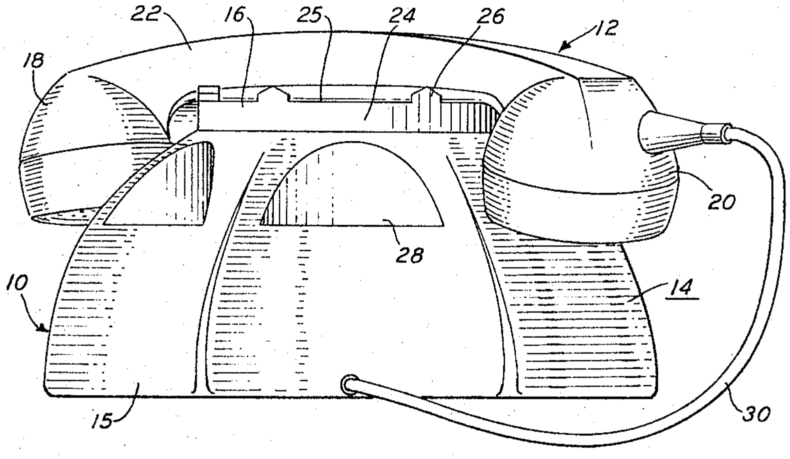
FIG. 1 is a side view of the telephone set of this invention.

Turning now to the drawing and to FIGS. 1 and 2 in particular, the telephone set comprises a base 10 and a handset 12. The base 10 includes a housing 14 having a generally hexagonal skirt 15 that tapers upwardly toward an annular rim 16, the housing having a truncated pyramidlike shape. The handset 12 is of a conventional shape, and it includes a bulbous receiver portion 18 and a bulbous transimtter portion 20 joined together by a narrow grip portion 22.

Figure 4:
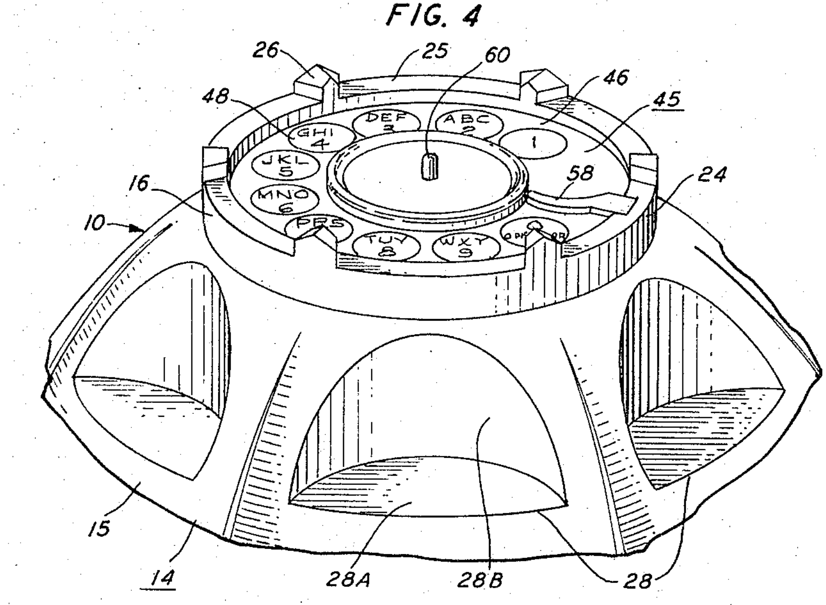
FIG. 4 is a perspective view of a portion of the base showing the dial of the telephone set.

As shown most clearly in FIG. 4, the rim 16 of the housing 14 has an outer surface 24 and an upper surface 25. The outer surface 24 of the rim 16 has a diameter that is significantly less than the diameter of the bottom edge of the skirt 15 but is only somewhat less than the distance between the closest points on the receiver and transmitter portions 18 and 20 of the handset 12. The upper surface 25 of the rim 16 lies in a generally horizontal plane and has a plurality of guide posts 26 extending upwardly therefrom.

The guide posts 26 are equally spaced around the rim 16 and the spacing between the guide posts is slightly greater than the width of the grip portion 22 of the handset. Thus each opposing pair of guide posts 26 is adapted to accommodate the grip portion 22 of the handset 12 therebetween, the handset when so positioned having the undersurface of the grip portion resting on the upper surface 25 of the rim 16.

In addition, the skirt 15 of the housing 14 has a plurality of wells 28 formed therein. Each of the wells 28 is centered between a pair of adjacent guide posts 26, and each includes an elliptical surface 28A and a shell shaped surface 28B. If the base 10 is positioned on a horizontal surface, each opposing pair of wells 28 is adapted to accommodate the receiver and transmitter portions 18 and 20 of the handset 12 when the handset is positioned between the pairs of guide posts with which the pair of wells is associated. If, on the other hand, the base 10 is mounted on a vertical surface with a pair of opposing wells lying along a line generally perpendicular to the horizontal, that pair of wells cradles the handset 12 when it is positioned between the pair of guide posts 26 with which that pair of wells is associated. Thus the telephone set of this invention is adapted to be mounted on either a horizontal or a vertical surface.

As in a conventional telephone set, the handset 12 is joined to the base 10 by a cord 30. The cord 30 may be coiled or it may be straight, as shown, in which case it advantageously retracts on a reel (not shown) in the base 10. In either case, the cord 30 is joined to the handset 12 by an anti-twist connector.

Figure 3:
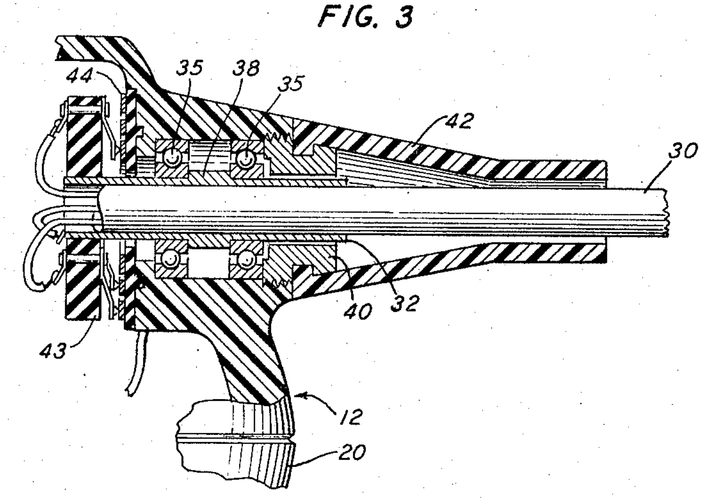
FIG. 3 is a sectional view taken along line 3—3 of FIG. 2 showing the anti-twist mechanism of the telephone set.

As shown in FIG. 3, the handset end of the cord 30 extends within and is secured to an anchor sleeve 32. The sleeve 32 is supported within an orifice in the transmitter portion 20 of the handset 12 by a pair of ball bearings 35. The outer races of the bearings 35 snugly engage the inner surface of the transmitter portion 20, while the inner races of the bearings engage the outer surface of the sleeve 32, permitting the sleeve and thereby the cord 30 to rotate freely. The bearings 35 are spaced from one another by a rim portion 38 which is an integral part of the sleeve 32. A retainer 40 threaded into the orifice in the transmitter portion 20 secures the bearings 35 within the orifice, and the bearings in turn interact with the rim portion 38 of the sleeve 32 to axially lock the sleeve in place. A flexible boot 42 is mounted on a groove in the retainer 40 and serves to prevent crimping of the cord 30 at the juncture of the cord with the sleeve 32.

The opposite end of the sleeve 32 extends within the transmitter portion 20 of the handset 12 and has a rotating contact plate 43 fixedly mounted thereon, the rotating contact plate being in juxtaposition with a stationary contact plate 44 mounted to the interior of the transmitter portion. The conductors carried by the cord 30 are secured to individual terminals on the rotating contact plate 43 and each terminal has a spring contact that is biased into engagement with an individual annular contact on the stationary contact plate 44. The individual annular contacts on the stationary contact plate 44 are in turn connected to conductors serving the various electrical components mounted within the handset 12.

Figure 5:
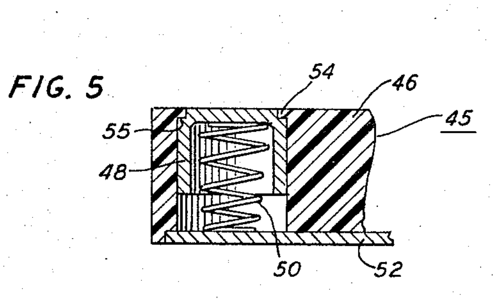
FIG. 5 is an enlarged sectional view taken along the line 5—5 of FIG. 2 showing an individual pushbutton of the dial.

Turning now to FIGS. 4 and 5, a dial 45 is located within the rim 16. The dial 45 includes a face member 46 having ten apertures spaced around the periphery thereof and positioned in each aperture is a pushbutton 48 having an individual digit inscribed on the upper surface thereof. Each pushbutton 48 is movable up and down within its respective aperture, but is biased upwardly by a spring member 50 that has one end thereof positioned within a recess in the underside of the pushbutton and has the other end thereof bearing against a plate 52 located on the underside of the face member 46.

A circular shoulder 54 formed in the upper edge of each pushbutton 48 cooperates with a circular ledge 55 on the face member 46 to limit the upward movement of the pushbutton to a position in which the upper surface of the pushbutton is substantially flush with the upper surface of the face member. Thus the digits appearing on the upper surfaces of the pushbuttons 48 are visible even when the dial 45 is viewed at an angle such as shown in FIG. 4.

The dial 45 may be of the conventional rotary type in which case the face member 46 is rotatable. To dial a particular digit, a subscriber depresses the pushbutton 48 having the desired digit inscribed thereon, thereby creating a finger hole, and then rotates the face member 46 in a clockwise direction until the movement of his finger is arrested by its engagement with a finger stop 58. Thereafter the subscriber removes his finger, whereupon the spring member 50 returns the pushbutton 48 to its upward position and a motor spring (not shown) wound up by the clockwise rotation of the face member counterrotates the face member 46 to its initial position.

Alternatively, the dial 45 may be of the pushbutton type, in which the mere depression of a pushbutton 48 actuates switching means (not shown) to transmit signals corresponding to the digit appearing on the pushbutton.

An axially movable switchhook plunger 60 extends through the center of the dial 45. The switchhook plunger 60 is biased to an upward position in which it extends above the upper surface 25 of the rim 16 and this is the position it occupies when the handset 12 is removed from the base 10. When, however, the handset 12 is returned to the base 10 and positioned between any two opposing pairs of guide posts 26, the underside of the grip portion 22 of the handset engages and depresses the switchhook plunger 60. Thus the switchhook plunger 60 is actuated by the presence of the handset 12 on the base 10 regardless of which of the plurality of rest positions in which it is placed.

What is claimed is:

1. A telephone set comprising:

a handset having a receiver portion joined to a transmitter portion by a grip portion; and a base including a housing having an annular rim at the upper end thereof, the periphery of the rim having a plurality of opposing locations thereon that are spaced apart a distance less than the distance between the receiver and transmitter portions of the handset, and the housing being relieved adjacent to each of these opposing locations so that the grip portion of the handset rests on the rim when handset is placed in any one of these locations.

2. A telephone set as in claim 1 further including a switchhook plunger positioned within the rim, the plunger being biased to extend above the rim.

3. A telephone set as in claim 2 wherein the switchhook plunger is depressed by the handset when the handset is placed in any of the locations on the rim.

4. A telephone set as in claim 1 further including a conductor carrying cord joining the handset to the base, the cord being rotatably mounted in the handset.

5. A telephone set as in claim 1 wherein the housing further includes a plurality of posts spaced about and extending upward from the rim, the posts serving to guide the handset into each of its locations.

6. A telephone set comprising:

a handset having a receiver portion joined to a transmitter portion by a grip portion, the grip portion having a particular width;

a base having a skirt that tapers upwardly toward an annular rim, the rim having an outer surface and an upper surface, the outer surface being of a lesser diameter than the distance between the closest points on the receiver and transmitter portions of the handset, the upper surface lying in a generally horizontal plane and having a plurality of guide posts extending upwardly therefrom, the guide posts being equally spaced around the rim, and the distance between the adjacent guide posts being greater than the particular width of the grip portion of the handset, the grip portion being accommodated between opposing pairs of guide posts in any one of a plurality of rest positions;

dialing means located within the rim of the housing, the dialing means including a face member having a plurality of apertures therein, an individual pushbutton positioned within each aperture, the pushbuttons being biased upwardly to a position wherein the upper surfaces thereof are substantially flush with the upper surfaces of the face member; and an axially displaceable switchhook plunger extending through the center of the dialing means, the switchhook plunger being biased to a position in which it extends above the rim of the housing, the switchhook plunger being depressed by the handset when the handset is placed on the base in any one of its plurality of rest positions.

7. A telephone set as in claim 6 wherein the skirt of the base has a plurality of wells formed therein, each of which is centered between a pair of adjacent guide posts, opposing wells being adapted to respectively accommodate the receiver and transmitter portions of the handset when the grip portion of the handset is positioned between the opposing pairs of guide posts with which the wells are associated.

8. A telephone set as in claim 6 further including a conductor carrying cord joining the handset to the base, the handset end of the cord being secured to a sleeve, a bearing member located within the handset rotatively supporting the sleeve, a retaining member securing the bearing member and sleeve within the handset, a first contact plate mounted on the sleeve, the first contact plate being in juxtaposition with a second contact plate mounted on the interior of the handset, the conductors carried by the cord being secured to individual terminals on the first contact plate and each terminal having a contact extending into engagement with an annular contact on the second contact plate.

References Cited

UNITED STATES PATENTS 2,794,861 5/1967 Heine -------------- 179—90

FOREIGN PATENTS 1,058,561 6/1957 Germany.
1,107,288 5/1961 Germany.

KATHLEEN H. CLAFFY, *Primary Examiner.*

A. H. GESS, *Assistant Examiner.*